Patented May 5, 1953

2,637,635

UNITED STATES PATENT OFFICE 2,637,635

SUPPLEMENTARY FUEL

Edward J. McLaughlin, El Cerrito, George H. Denison, Jr., San Rafael, and Maurice R. Barusch, Richmond, Calif., assignors to California Research Corporation, San Francisco, Calif., a corporation of Delaware No Drawing. Application June 9, 1949, Serial No. 98,166

14 Claims. (Cl. 44—53)

The present invention relates to a spark-ignition engine fuel composition; particularly, to a fuel composition which is to be injected into a spark-ignition engine.

As the design of spark-ignition engines has advanced, engines have been developed in which the compression ratio has been increased from a low-compression ratio of 4 to 1 to a high-compression ratio as high as approximately 7.5 to 1. It is known, as compression ratio increases, fuels of higher octane rating are required.

Knocking occurs more readily in high-compression engines than in low-compression engines and is most prominently noticed when the engine is subjected to full throttle or the engine is operating under a heavy load. For example, when airplanes are taking off, a terrific upsurge in power output is required. On take-off, the airplane engines are functioning at high load capacities and require high-octane fuels in order to function properly without knocking.

Several methods of inhibiting this knocking in spark-ignition engines have been evolved during the past years. On the one hand, the octane values of fuels have been increased. This has been done by adding octane number improvers such as lead tetraethyl or high-octane blending stocks directly to the spark-ignition-engine hydrocarbon fuel. On the other hand, knock inhibition has been accomplished by the use of water-alcohol mixtures which are injected into the spark-ignition engine as supplementary fuels. At one time, plain water was used as an anti-knock agent by injecting it into the engine along with the vaporized fuel.

The injection system of introducing the anti-knock agents into the fuel-intake system of the spark-ignition engine is advantageous as a means of employing gasoline insoluble anti-knock agents rather than trying to disperse them in the gasoline-base fuel itself, as it permits the use of fuel soluble or insoluble in the anti-knock agents. Furthermore, the injection of anti-knock agents into the fuel-intake system as a separate stream from that of the base fuel itself tends to reduce engine deposits on the pistons and engine knocking. Engine knocking, besides being obnoxious to the ear, may result in engine overheating, engine power loss and engine piston sticking.

It is a primary object of this invention to inhibit knocking in a spark-ignition engine.

It is an object of this invention to provide a fuel composition which will inhibit knocking in a spark-ignition engine.

It is a further object of this invention to produce an anti-knock composition suitable for injection into a spark-ignition engine.

It is another object of this invention to inhibit knock in a spark-ignition engine using a fuel of lower octane number than that normally required for completely knock-free operation.

It is a still further object of this invention to increase the over-all economy of a spark-ignition engine by injecting an anti-knock fuel composition into the fuel-air mixture in a spark-ignition engine.

These and other objects will be readily apparent from the following detailed disclosure of the present invention.

According to this invention, a water-alcohol mixture containing phenylene diamines having no nitrogen - bonded substituents other than methyl groups and having not more than two of such methyl substituents and having no carbon-bonded substituents other than hydrocarbon groups containing fewer than five carbon atoms will suppress engine knocking when injected as a supplementary fuel into a spark-ignition engine.

As used herein and in the appended claims, "supplementary fuel" is a fuel which is used in addition to a primary fuel, that is, a fuel composition which is additional to the gasoline type of spark-ignition fuel. The "supplementary fuel" frequently is injected into the engine at a point on the intake manifold where the gasoline already has been mixed with air.

A further advantage obtained by injecting an anti-knock composition in a stream separate from the primary fuel-air mixture lies in the fact that the anti-knock mixture may be used just at those times when it is required. The present high-compression engines, when operated at normal loads and speeds, do not always require high-octane gasolines. When a spark-ignition engine is being operated under moderate load conditions, for example, when a car is moving along a level road at a constant speed, there is little tendency toward knocking; thus, there is no requirement for an anti-knock agent to be used in the fuel stream. For example, a present-day automobile may be driven on relatively level roadways at constant speeds of 30, 40, 50, or 60 miles per hour and use a low-octane gasoline (such as 40 octane) without knocking occurring. However, when a spark-ignition engine is accelerated swiftly or there is a sudden load thrust upon the engine because of an incline, then there is a necessity for the use of an anti-knock agent to suppress the "knocking" resulting from the full-throttle operation of the engine.

In order to avoid the knocking accompanying the use of too low an octane fuel under such full-throttle conditions as noted above, water-alcohol-additive compositions may be injected into the intake system of the engine during the time when the additional power requirements are necessary to be met.

The power requirements of a spark-ignition engine resulting in knocking exist usually for relatively short periods of time in the total operation of the engine. This characteristic makes it extremely beneficial to use a dual fuel system whereby a relatively low-octane gasoline is used during constant load conditions while a second fuel composition containing an anti-knock agent may be injected at those moments when the higher power output is necessary. Thus, one fuel system supplies a primary motor fuel of relatively low octane number which meets the anti-knock requirements for normal "cruising" operations, and a second fuel system supplies a supplementary fuel to bolster the primary fuel when greater power and anti-knock requirements are suddenly needed. Such a fuel system would thereby eliminate the use of high-octane-number fuel and at the same time completely satisfy the anti-knock requirements of a spark-ignition engine. For example, it is possible to obtain knock-free operation of a spark-ignition engine by using 40 octane number fuel for a majority of the time in an engine having a normal road requirement of 77 octane number.

The supplementary fuel of this invention comprises water, alcohol, and active anti-knock agents with the alcohol at least in part acting as the main solvent for the anti-knock agents.

The alcohol of the composition of this invention may be selected from alcohols containing from 1 to 4 carbon atoms. It is generally preferred that methyl alcohol be used in the composition of our invention. Examples of the alcohols which may be used include: methyl alcohol, ethyl alcohol, propyl alcohol, isopropyl alcohol, n-butyl alcohol, isobutyl alcohol, secondary butyl alcohol, and tertiary butyl alcohol.

Alcohols may be the only solvent used in this invention, but in normal practice, the alcohol may be diluted with water, forming an aqueous-alcohol solution. The water and alcohol may be mixed in such proportions as to form water-alcohol mixtures containing from about 5 to 95 per cent by volume of alcohol and about 5 to about 95 per cent by volume of water. However, it is preferred to use water-alcohol mixtures containing from about 40 to about 90 per cent by volume of alcohol and about 10 to about 60 per cent by volume of water.

The particular anti-knock agents of compositions of this invention are phenylene diamines. As noted above, alcohol, water, and mixtures thereof have heretofore served as anti-knock agents in spark-ignition engine fuel compositions. However, the alcohol, the water, and the alcohol-water blends are remarkably improved as anti-knock agents by the addition of phenylene diamines. Examples of the phenylene diamines of this invention are isomeric phenylene diamines; N-methyl-p-phenylene diamines; N-methyl-o-phenylene diamines; N,N'dimethyl-p-phenylene diamines; N,N'dimethyl-o-phenylene diamines; or a nuclear hydrocarbon homologue of any of these diamines containing one or more carbon-bonded hydrocarbon or nuclear (as they may be called) substituents. The term "nuclear homologue" is intended to include substitutions by hydrocarbon groups of hydrogen attached to the benzene ring. This is exemplified by the following formula:

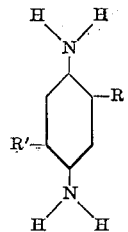

wherein R and R' are hydrocarbon substituents. These nuclear or carbon-bonded substitutions should have no substituents other than hydrocarbon groups containing fewer than 5 carbon atoms. It is generally preferred to have phenylene diamines having not more than about $C_3$ or less alkyl hydrocarbon nuclear or carbon-bonded substituents. Examples of the homologues include: N,N' - dimethyl-1-2-diamino-4-methyl benzene; N,N'-dimethyl-1-4-diamino-2-isopropyl benzene; 4-methyl amino-2-methyl aniline.

The preferred phenylene diamines are N,methyl and N,N'-substituted phenylene diamines, such as N,N'-dimethyl-p-phenylene diamine as an anti-knock agent in the alcohol-water-phenylene diamine composition of this invention.

Instead of a single phenylene diamine, mixtures of two or more compounds may be used, such as N-methyl-p-phenylene plus N,N' - dimethyl - p-phenylene diamine. Also mixtures of one of these compounds with by-products of its synthesis may be used. For example, when N-methyl-p-phenylene diamine is synthesized by known methods, the crude product contains small amounts of N,N'-dimethyl-p-phenylene diamine, N-dimethyl-p-phenylene diamine, methylated-p-phenylene diamines containing more than two methyl groups, and, sometimes, some free p-phenylene diamine, and small amounts of unreacted constituents. This crude mixture is an effective additive. Furthermore, other spark-ignition engine fuel additives, such as tetraethyl lead, iron carbonyl, etc., may be included in the water-alcohol injection composition containing the amines of this invention.

The water, alcohol and phenylene diamines may be blended simply by mixing the components of the mixture. Heating or agitating may be necessary in some instances, in order to aid the blending. However, it is generally preferable to dissolve the phenylene diamines in the alcohol and then dilute with water.

In addition to the water, alcohol, and phenylene diamine of the injection fuel of this invention, minor amounts of various inhibitors may also be added. These inhibitors include stabilizers and corrosion inhibitors such as sodium alkyl sulfonates, etc.

The primary fuels which are improved by the injection of the supplementary fuel composition of this invention may be any hydrocarbon boiling in the gasoline boiling range; that is, having an ASTM (D-86) distillation with an initial boiling point of about 100° F. and a final boiling point of about 400° F.

The primary fuels may be leaded or unleaded. It is preferred to use an unleaded primary fuel from the standpoint of using a fuel which does not have the deleterious effects of lead and also which generally is less expensive than a leaded fuel. On the other hand, leaded fuels are preferred where there is an extraordinarily high percentage of time when the engine is used under conditions requiring greater amounts of power output which could not be attained with unleaded fuels.

As noted hereinabove, the water-alcohol mixtures may be varied to contain the above-noted various proportions of water and alcohol in the mixture. The phenylene diamines of this invention may be present in the water-alcohol mixtures in amounts of three per cent by volume of the final composition to an amount limited by solubility of the phenylene diamines in the water-alcohol mixture, with 8 per cent to the solubility limit being preferred.

As stated hereinabove, the water-alcohol-phenylene diamine composition normally is not continuously injected into the spark ignition engine during the whole time when the engine is in operation. Preferably, it is injected only intermittently, as required. This does not mean that the water-alcohol-phenylene diamine mixture is injected with total disregard to the amount of base fuel which is being used in the engine. During the periods of secondary fuel injection, the water-alcohol-phenylene diamine mixture may be injected in such amounts as to constitute from two per cent to 50 per cent of the total mixture flowing to the combustion chamber; two per cent to 20 per cent being preferred. That is, the ratio of primary fuel to this water-alcohol-phenylene diamine mixture injected normally would be from 49:1 to 1:1, with 49:1 to 5:1 being preferred. For example, an injection fuel of this invention consisting of a mixture of 45 per cent alcohol, 45 per cent water and 10 per cent of a phenylene diamine, may be injected into the intake manifold of a spark-ignition engine at the rate of one part of the water-alcohol-phenylene diamine mixture to 10 parts of primary fuel to suppress the detonation and increase the available power output of a spark-ignition engine during rapid full-throttle acceleration.

The method of this invention reduces the need for large quantities of leaded gasolines and permits the use of less highly-refined spark-ignition engine fuels having lower octane numbers than normally required for satisfactory operation of high-compression engines.

Fuel compositions of this invention were tested and rated according to the F-4 method, described in a report by the Coordinating Research Council dated April 20, 1943, and entitled "CFR Supercharge Method of Test for Knock Characteristics of Aviation Fuels." This method, the description of which has been widely circulated and which is widely used, rates a fuel under conditions of supercharging and rich fuel-air mixtures and it correlates well with full-scale ratings of fuels, as in aircraft take-off and climbing. The engine employed is a single-cylinder, liquid-cooled, gasoline spark-ignition engine; the engine is equipped for supercharge; the compression ratio is 7:1; the engine is operated at 1800 R. P. M., 375° F. jacket temperature, 225° F. air temperature and 45° spark advance BTC; and the supplementary fuel consisting of alcohol, water and additive is injected into the intake manifold so that it is combined in the intake manifold with the primary fuel-air mixture.

Ratings by the F-4 method are given in terms of octane numbers up to 100 octane, and above 100 octane they are given in performance numbers. The performance number is used to designate the relative knock-limited power output of fuels having octane numbers above 100 when tested according to the F-4 procedure. Isooctane having an octane number of 100 has a performance number of 100. A fuel having a performance number of 130, for example, has a knock-limited power output 1.3 times that of the fuel having a performance number of 100.

The examples in the following table will serve to further illustrate the practice and advantages of this invention. In the examples, water-alcohol mixtures were injected into the engine at a rate of one volume water-alcohol mixture per 10 volumes of petroleum fuel. The water and alcohol (methyl alcohol) were present in equal volumetric proportions and the phenylene diamines were added in the indicated percentages by volume. The test engine was operated at a fuel-air ratio of 1:10. The composition of the primary fuel was 11% cumene, 27.5% alkylate, 61.5% $C_{13}$ (distillate cut containing paraffins and naphthenes), and 4 ml./gal. of aviation TEL. The performance number of the primary fuel was 131.

*Table*

| Example | Supplemental Fuel | Performance Number |
|---|---|---|
| 1 | None | 131 |
| 2 | 50% water and 50% methyl alcohol | 138 |
| 3 | 47.5% water, 47.5% methyl alcohol, and 5% o-phenylene diamine. | 145 |
| 4 | 45% water, 45% methyl alcohol, and 10% m-phenylene diamine. | 145 |
| 5 | 45% water, 45% methyl alcohol, and 10% p-phenylene diamine. | 157 |
| 6 | 47.5% water, 47.5% methyl alcohol, and 5% N,N'-dimethyl-p-phenylene diamine. | 153 |
| 7 | 45% water, 45% methyl alcohol, and 10% N,N'-dimethyl-p-phenylene diamine. | 165 |
| 8 | 45% water, 45% methyl alcohol, and 10% N-methyl p-phenylene diamine. | 173 |
| 9 | 45% water, 45% methyl alcohol, and 10% 3,4-diamino toluene. | 150 |
| 10 | 45% water, 45% methyl alcohol, and 10% N-dimethyl-p-phenylene diamine. | 146 |
| 11 | 45% water, 45% methyl alcohol, and 10% N-acetyl-p-phenylene diamine. | 142 |

From the foregoing table, it can be seen that all of the phenylene diamines give an increase in performance numbers. Of the isomeric phenylene diamines, m-phenylene diamine is the least effective. Therefore, it is generally preferred to use p- and o-phenylene diamines in the composition of this invention.

This table also discloses that N-mono-methyl-substituted phenylene diamines are the most effective with the N,N'-dimethyl-substituted phenylene diamines being somewhat more effective than the non-methyl-substituted. With this latter in mind, it is generally preferred to use phenylene diamines in the composition of this invention having only two nitrogen methyl substitutions. As can be seen from Example 11, other than methyl substitutions on the nitrogen atoms do not give particularly desirable supplementary fuel anti-knock agents. Therefore, it is generally preferred to use phenylene diamines having no N-bonded substituents other than methyl groups.

While our invention has been described herein with reference to certain specific embodiments and specific examples thereon, we do not intend that our invention shall be limited to such embodiments and examples except as hereinafter defined in the appended claims.

We claim:

1. A supplementary spark-ignition engine fuel comprising a major proportion of a water-alcohol mixture and at least about three per cent by volume to an amount limited by the solubility in said alcohol-water mixture of phenylene diamines having no nitrogen-bonded substituents other than methyl groups and not more than two of said methyl groups and having no carbon-bonded substituents other than hydrocarbon groups containing fewer than five carbon atoms and wherein the water and alcohol are present in the water-alcohol mixture in the proportion of from about 5 to about 90 per cent by volume of water and from about 10 to about 95 per cent by volume of alcohol.

2. The composition of claim 1, wherein said phenylene diamines are present in amounts of at least 8 per cent by volume to an amount limited by the solubility of said phenylene diamines in said water-alcohol mixture.

3. The fuel composition of claim 1, wherein said phenylene diamines are present in amounts between about 8 to about 15 per cent.

4. The fuel composition of claim 1, wherein said alcohol-water mixture comprises at least 75 per cent of said fuel.

5. The composition of claim 1, wherein said phenylene diamines are p-isomers.

6. A fuel composition of claim 1 wherein said alcohol is methyl alcohol.

7. A fuel composition of claim 1 wherein said alcohol is ethyl alcohol.

8. The composition of claim 1 wherein said alcohol is isopropyl alcohol.

9. The composition of claim 1 wherein said phenylene diamines are o-phenylene diamines.

10. The composition of claim 1 wherein said phenylene diamines are N-methyl-substituted.

11. The composition of claim 10 wherein said N-methyl-substituted phenylene diamines are p-isomers.

12. The composition of claim 1 wherein said phenylene diamines are N,N'-methyl-substituted.

13. The composition of claim 12 wherein said N,N'-methyl-substituted phenylene diamines are p-isomers.

EDWARD J. McLAUGHLIN.
GEORGE H. DENISON, Jr.
MAURICE R. BARUSCH.

References Cited in the file of this patent

UNITED STATES PATENTS

| Number | Name | Date |
|---|---|---|
| 1,713,589 | Berslavsky | May 21, 1929 |
| 2,120,244 | Dryer | June 14, 1938 |
| 2,429,707 | Catalano | Oct. 28, 1947 |